United States Patent Office 2,810,810
Patented Oct. 22, 1957

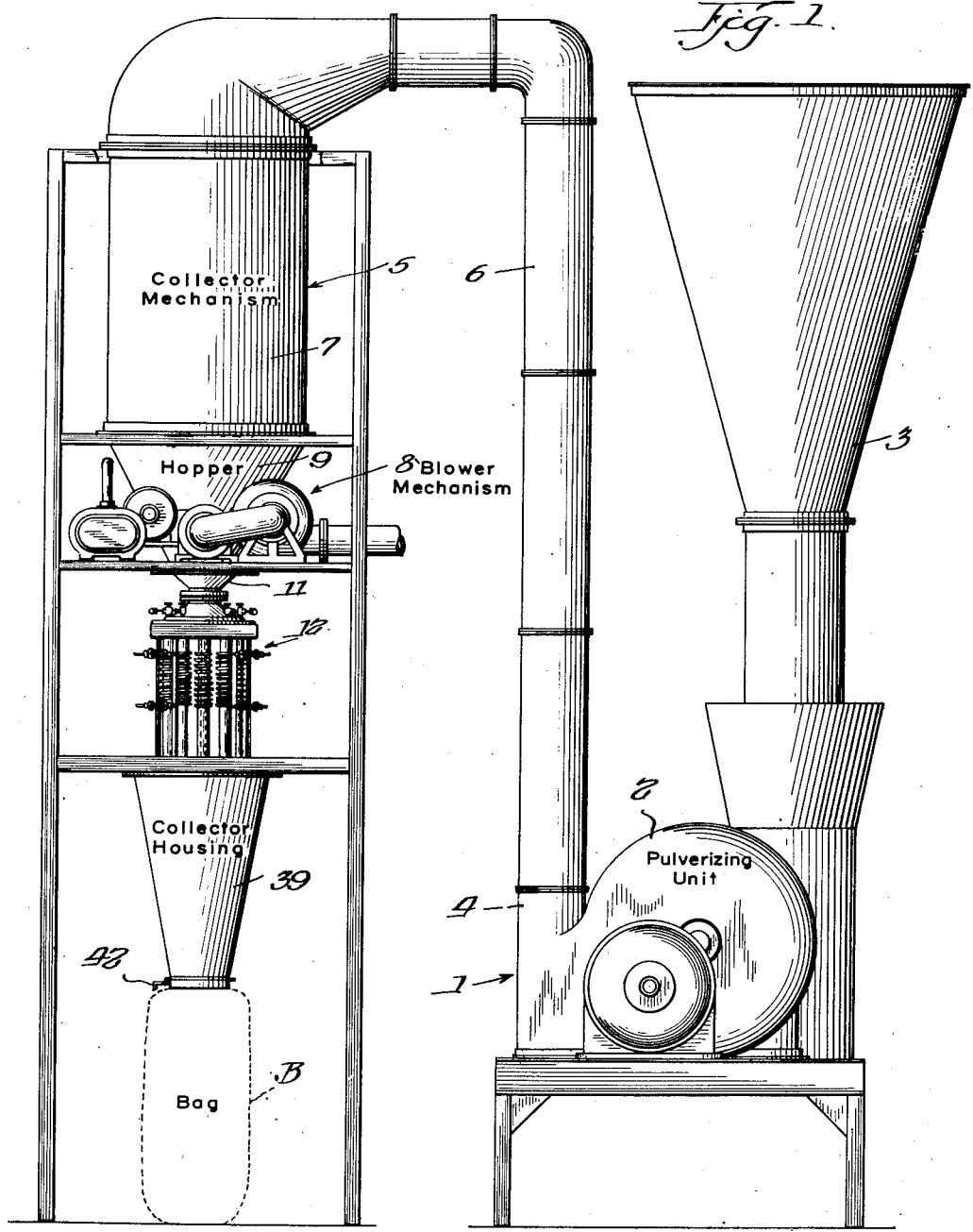

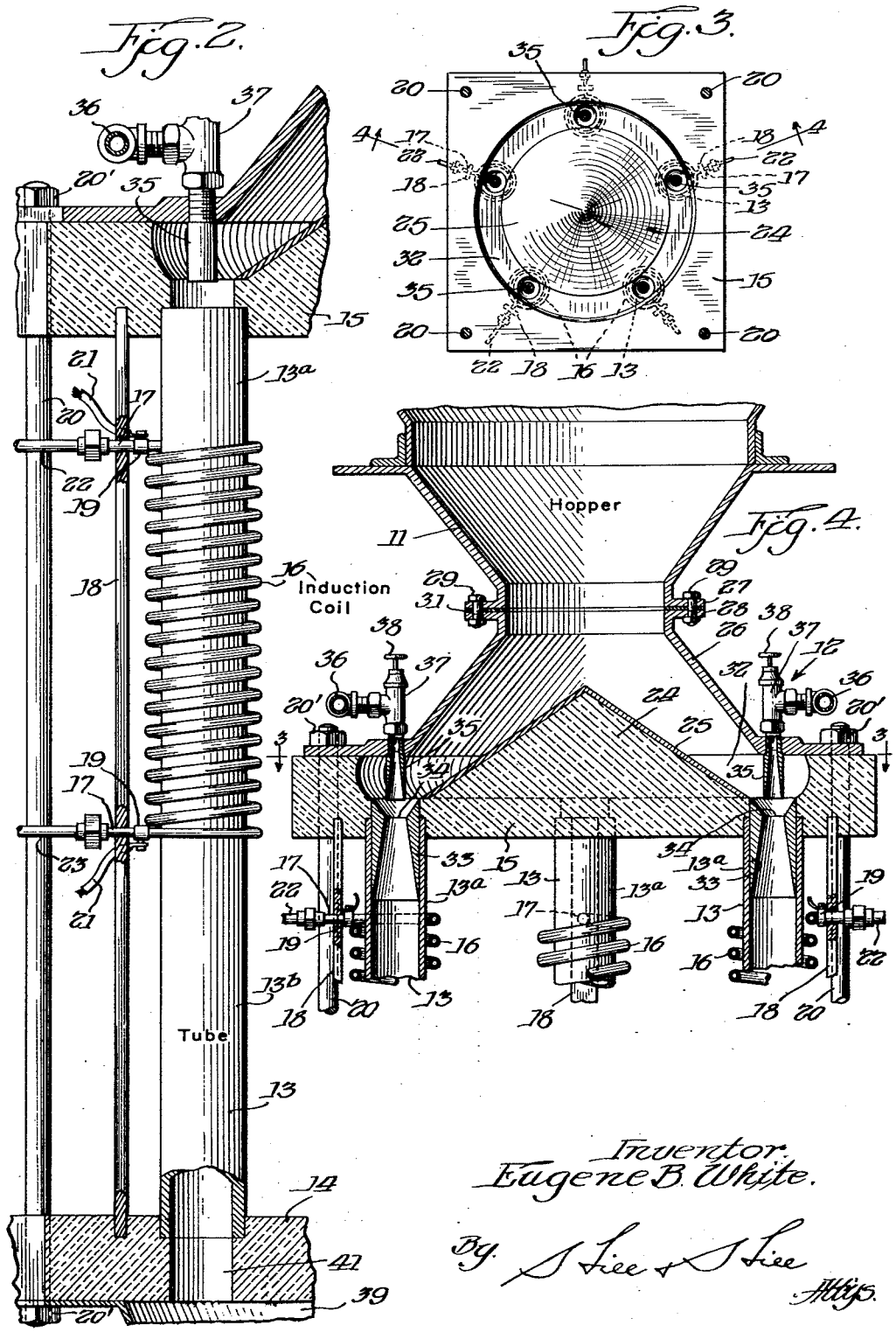

2,810,810

APPARATUS FOR EXPANDING FINELY DIVIDED PARTICLES OF OBSIDIAN-LIKE MATERIAL

Eugene B. White, Oak Park, Ill.

Application March 28, 1949, Serial No. 83,822

1 Claim. (Cl. 219—10.65)

The invention relates generally to the production of silicious material in spherical microscopic form, and more particularly to an improved process and apparatus for producing the same. The invention is particularly adapted, for example, to the production of filter materials, such as that disclosed in my copending application, Serial No. 43,991, filed August 13, 1948, and titled Filter and Material Therefor, now abandoned.

Filter material of this type comprises extremely fine particles of a suitable obsidianite, such as perlite, which has been expanded by the application of heat thereto to form a porous structure.

The present invention is, therefore, particularly adapted for the production of microscopic particles of expanded material which, for example, may range in size from about 10 to 250 or more microns as compared to previous methods and apparatus for expanding similar materials which have involved considerably greater sized pieces of such material.

In the past, the accepted practice in expanding fusible material, such as here involved, has broadly consisted of mixing the material to be treated with air and a suitable fuel, passing the mixture into a suitable chamber in which the fuel is ignited, whereby the heat of combustion thereof is sufficiently high to cause fusing of the material, and as the latter contains a percentage of moisture, it results in the expansion thereof. An example of apparatus for accomplishing these results is illustrated in Patent 2,044,680, issued on June 16, 1936, to C. G. Gilbert. As set forth in such patent, considerable difficulty has been experienced in obtaining uniform results, as well as the inability to accurately control the variables inherent in such process. Obviously, in any process employing heat of combustion as the expanding medium, a serious problem with respect to the extinguishment of combustion due to absorption of heat by the particles being expanded, and as pointed out in the patent above referred to, the heat absorption rate of the particle increases tremendously as the particle size diminishes, and that along with the increased absorption rate resulting from decreasing of particle size, the rate of absorption increases directly with the increase in the total amount of solids present at the combustion point. Consequently, in any process embodying a mixture of the particles to be expanded with the combustible material, the quantity of expanded material produced is definitely limited, as the dispersion of the particles must be limited to a point at which the rate of heat absorption is below the rate of combustion, whereby reignition of the gases enveloping the particles will take place. The Gilbert patent attempts to partially correct the difficulty by controllably dispersing the individual particles of the material to be treated, employing, however, temperatures of combustion as the temperatures of expansion.

The present invention is directed to a process whereby heat is applied to the particles to be expanded without combining the same with combustible fuel as, for example, utilizing radiated heat created by high frequency induction, whereby all variables involved in the expansion of the material may be readily and accurately controlled, and by means of which the characteristics of the expanded material as to range of size, density, tensile strength, etc., may be produced, as desired, in the finished material.

The present invention is, therefore, directed to a novel process for expanding particles of fusible material of microscopic size, which process is extremely efficient, and by means of which accurate control of the finished product may be maintained.

A further object of the invention is the utilization of such a process capable of producing high uniformity of the finished material and the desired uniform expansion of all the material treated without requiring reprocessing.

Another object of the invention is the provision of such a process which may be readily practiced on a commercial basis whereby the expanded material may be produced at relatively low cost.

A further object of the invention is the production of novel apparatus which is exceedingly simple in construction and efficient in operation for expanding microscopic particles of fusible material.

A further object of the invention is the provision of a novel method and apparatus for performing the same by means of which expanded particles of microscopic size may be produced and collected without the necessity of employing classifiers, or the like.

Many other objects and advantages of the construction herein shown and described will be obvious to those skilled in the art from the disclosure herein given.

In practicing the present invention, the material to be expanded is first pulverized to a pre-determined size dependent upon the characteristics desired in the finished material, following which the pulverized material is controllably dispersed in a suitable vehicle, such as air or a suitable gas, the latter or air, if desired, being pre-heated. The air and suspended material is then passed through a chamber heated by radiation, whereby all particles of the dispersion are uniformly heated to the desired temperature, resulting in expansion of the material, which is then permitted to cool below the fusing temperature, and subsequently collected. The expanding chamber is preferably heated by high frequency induction whereby the size of the expanding zone, as well as the temperature therein, may be very accurately controlled. I am thus able to accurately control the dispersion of the particles in the air or other vehicle, the temperature of the expanding zone through which the particles pass, the rate of passage through the expanding zone, as well as the size or length of such a zone.

In addition to the above results achieved by the use of the present invention, the present heating and cooling of the fusible material may also be readily controlled, and it will, therefore, be apparent that each individual step in my improved process may be individually controlled whereby the finished material may be produced with any desired inherent characteristics.

For the purpose of illustration, the process will be described in conjunction with one form of apparatus for performing the same.

In the drawings, wherein like refernce characters indicate like or corresponding parts:

Fig. 1 is a side elevational view of an apparatus for carrying out the present invention;

Fig. 2 is a side elevational view of one of the heating tubes employed with portions thereof and the surrounding structure shown in section;

Fig. 3 is a sectional view taken approximately on the line 3—3 of Fig. 4; and

Fig. 4 is a sectional view taken approximately on the line 4—4 of Fig. 3.

Referring to the drawings, and more particularly to Fig. 1, 1 indicates generally a pulverizer comprising a pulverizing unit 2, having an opening 3 for the reception of the crude fusible material, and an outlet duct 4 for the pulverized material. The pulverizer 1 is adapted to produce a pulverized fusible material the size of the individual particles ranging from 1 to 25 microns, as desired, and units of this type are readily procurable in commerce. Consequently the details of construction thereof form no part of the present invention.

The outlet of the pulverizer 1 is connected to collector mechanism through a duct 6, and in the construction illustrated, includes a bag member 7 and lower mechanism, indicated generally by the numeral 8. The collector mechanism 5 is operative to move the pulverized material from the pulverizer 1 through the duct 6 and collect such material in a hopper, the lower end of which is indicated at 11. The collector mechanism 5, including the bag 7 and blower mechanism 8, is commercially procurable; consequently, the details thereof form no part of the present invention.

Positioned below the collector mechanism 5 is a heating or oven structure, indicated generally by the numeral 12, the details of which are illustrated in Figs. 2, 3, and 4.

Referring to Figs. 2, 3, and 4, the structure 12, in the construction illustrated, comprises a plurality of tubes 13, five tubes being employed in the present instance, as illustrated in Fig. 3. The tubes 13 are hollow and constructed of a suitable ferromagnetic material having a very high melting point. Each tube 13 is supported at its lower end by a base member 14, and at its upper end by a member 15, the ends of the tube being inset in the respective members, as clearly illustrated in Figs. 2 and 4. The members 14 and 15 are constructed from a suitable insulating material capable of withstanding very high temperatures, such as a mixture of asbestos and a suitable cement, or the like, an example of which is known in the trade as "Electrobestos." Each tube 13 forms an oven or heating chamber in which the pulverized material is adapted to be expanded and, in the construction illustrated, each tube 13 is adapted to be heated by induction, each tube having an induction coil 16 encircling a portion of the tube with the ends 17 of each coil extending through a supporting member 18, the ends of which are also inset in the respective members 14 and 15. Each member 18 is constructed from a suitable insulating material which may, if desired, be the same material as the members 14 and 15. The ends of each coil 16 are provided with suitable connectors 19, to which are secured electrical conductors 21, the latter being adapted to be operably connected to a suitable source of high frequency current. The tube 13, and members 14, 15, and 18 may be held in assembled relation by any suitable means, such as bolts 20 and nuts 20'. As high temperatures of 2,000 degrees Fahrenheit or more may be involved, each coil 16 is preferably made from hollow tubing whereby the ends 17 of the coil may be operatively connected to a coolant supply line 22, and a return line 23 whereby each coil, which normally would be made of a relatively low melting point metal, may be satisfactorily cooled and thus maintained below melting temperatures.

As high frequency current is passed through the coils 16, the portions of the tubes 13 positioned in the coil will be heated by induction whereby material passing through the tubes will be heated by radiation from the interior wall surface of the respective tubes.

As illustrated in Figs. 3 and 4, the member 15 is provided with a central conical shaped portion 24, preferably having a face 25 of metal or other suitable material of sufficient hardness to eliminate undue abrasion of the portion 24 by action of the pulverized material as it flows through the device. Mounted on and secured to the top of the member 15 by the bolts 20 is a generally conical shaped housing 26 connected at its upper end to the end 11 of the hopper 9, adjacent portions of the end 11 and member 26 being provided with complementary flanges 27 and 28 secured together by bolts 29, or other suitable means, with a gasket 31 being interposed between the two flanges. Surrounding the conical portion 24 is an annular shaped channel or groove 32, which operatively communicates, at spaced points, with the interior of the tubes 13.

The upper end of each tube 13 is provided with a Venturi sleeve 33, which is formed with an orifice 34, the side interior walls of the sleeve tapering outwardly from the orifice 34 towards the respective ends of the sleeve, as clearly illustrated in Fig. 4. Positioned above and axially aligned with each of the orifices 34 are respective nozzles 35 adapted to be operatively connected to an air or gas supply line, indicated generally by the numeral 36, through a suitable valve 37 having a control handle or wheel 38. All of the respective valves 37 are operatively connected to the supply line 36, the connecting piping between the respective valves, however, not being shown.

Positioned below and secured to the base member 14 by the bolts 20 is a suitable housing 39 adapted to receive and collect material passing downward from the respective tubes 13, the member 14 being provided with bores 41, each aligned with one of the respective tubes 13 to permit passage of the material through the member and into the collector housing 39, the latter member provided at its lower end with a suitable valve 42 and means for attaching a bag, or other receptacle, to the housing as, for example, the bag "B" indicated in dotted lines in Fig. 1.

In the operation of the device, the fusible material is inserted in the hopper 3 and passed through the pulverizer 2, which will reduce the material to particles of a pre-determined size. The pulverized particles are then moved through the duct 6 to the collector mechanism 5, where they are deposited in the bag 7, and ultimately dropped to the lower end 11 of the hopper 9, thus passing into the housing 26, where the conical shaped portion 24 will direct the material to the upper ends of the sleeves 33.

The valves 37 are each adjusted to admit a desired amount of air through the nozzles 35, and carry the pulverized material into the tubes 13, where the material will pass downwardly through the heated portions of the tubes, and out the lower ends of the latter into the hopper 39. It will be apparent that as the particles of the material being processed have a density less than one, the rate of flow of material into the tubes 13 is substantially dependent upon the amount of air discharged from the nozzles 35, whereby adjustment of the valve 37 will provide a convenient means for controlling the flow of material through the tube. As the tubes 13 are heated, there would be a normal tendency for an upward circulation of air through the tubes by convection, and in some cases it may be desirable that the amount of air admitted through the nozzles 35 be merely sufficient to insure a flow of material into the tubes 13, in which case the amount of air flow would be more or less slightly above that required to offset the upward convection flow of air in the tube whereby the particles pass through the tube substantially by the influence of gravity. The temperature of the heated portions of the tubes 13, and thus the expansion of the particles passing through the tube, may be readily and accurately controlled by varying the frequency of the voltage applied to the coils 16, and I have found that a range of from 100,000 to 200,000 cycles in the voltage applied to the coil 16 will provide an adequate temperature range for the purposes intended. The coil 16 is preferably spaced a distance from the upper member 15 to provide a pre-heating zone for the material being processed. Thus as the material passes through the portion 13a located between the member 15 and the top end of the coil 16, such material will receive an amount of pre-heating prior to passing into the hot zone encircled by the coil, such pre-heating resulting from the heating of the portion 13*a* by conduction to a temperature somewhat less than that in the hot zone. Likewise, the lower exposed portion 13*b* of each tube between the lower end of the coil 16 and the member 14 provides a cooling zone, as the temperature of this portion of the tube will be less than that in the hot zone, the length of the portion 13*b* being sufficient to insure the temperature reduction of the processed particles below the solidifying point prior to their entry into the hopper 39.

It will be noted from the above description that the apparatus above described provides accurate control of the flow of the material through the tubes 13, and also the accurate control of the temperature at which the particles are heated; also the range of particle sizes of the unprocessed material may be controlled by suitable adjustment of the pulverizer 2. The construction described also creates a substantially uniform dispersion of the particles passing through the respective tubes, and as the particles are heated by radiation, it will be apparent that substantially uniform heating of the particles dispersed in the tube is achieved regardless of the particular concentration of the particles. As a result, the fusing together of individual particles is eliminated. Likewise, as no reactions of combustion in the tubes are involved, a uniform and complete processing of the material is achieved, and it is, therefore, unnecessary to reprocess any of the material once it has passed through the tubes.

In view of the accurate control of the variables involved, I am able, in practicing my invention, to produce not only uniform and complete results, but am also able to accurately control both the size and structure of the expanded particles. For example, by proper control of the flow of and temperature at which the material is heated, the particle may be substantially completely expanded whereby it will have a relatively thin and fragile cellular structure or, if desired, the particle may be only partially expanded, resulting in a smaller particle having a thicker and stronger cellular structure.

While I have illustrated the application of my novel process by means of the apparatus herein described, it will be apparent that the present process is applicable to and may be carried out by means of various types of apparatus, which may employ other means of heating the particles to expansion temperature, as well as other means for controlling the dispersion of material prior to the applicatiin of heat thereto. Likewise, while I have referred to the injection or dispersion of material by means of air, obviously, if desired, a suitable gas may be employed and, in either case, the gas or air may, if desired, be preheated prior to the dispersion of the material therein. It will be noted from the above description that the present invention permits the production of an expanded fusible material, the size and characteristics of which may be accurately controlled to produce a particle of microscopic size which is highly vesicular and substantially spherical in shape; likewise, that the process herein described may be performed by substantially relatively simple apparatus, such as the example herein shown and described.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

Apparatus for expanding finely divided particles of obsidian-like material from a predetermined particle size varying within the range of from substantially 1 to 25 microns comprising top and bottom supporting members, a tube extending between said members, said tube being open at both ends, a container for the material positioned above and communicating with the upper end of said tube, such tube end being formed with a Venturi passage therein, a gas discharge nozzle positioned adjacent the upper end of each tube for directing a gas into said passage, said nozzle being adapted to be operatively connected to a source of gas under pressure, means for controlling the flow of gas from said nozzle for dispersing the finely divided particles in the gas forming a substantially uniform suspended mass, an induction coil surrounding a portion of said tube, such portion having side walls of a ferro-magnetic material, said coil being adapted to be connected to a source of high frequency current for heating the suspended mass above the fusing temperature of said material whereby microscopic particles of expanded material are formed varying within the range of from substantially 10 to 250 microns in particle size, said tube extending below said coil a predetermined distance to provide a cooling space for material passing therethrough, and means adjacent the opposite end of said tube for collecting the treated material.

References Cited in the file of this patent

UNITED STATES PATENTS

| | | |
|---|---|---|
| 413,552 | Pratt | Oct. 22, 1889 |
| 904,991 | Price | Nov. 24, 1908 |
| 962,532 | Schwahn | June 28, 1910 |
| 1,289,056 | Rowand | Dec. 24, 1918 |
| 1,587,197 | Southgate | June 1, 1926 |
| 1,603,165 | Swoboda et al. | Oct. 12, 1926 |
| 1,995,803 | Gilbert | Nov. 1, 1932 |
| 2,038,251 | Vogt | Apr. 21, 1936 |
| 2,265,358 | Denning | Dec. 9, 1941 |
| 2,291,532 | Clark | July 28, 1942 |
| 2,306,462 | Moorman | Dec. 29, 1942 |
| 2,409,707 | Rothelli | Dec. 22, 1946 |
| 2,431,884 | Neuschutz | Dec. 2, 1947 |
| 2,501,698 | Stecker | Mar. 28, 1950 |
| 2,501,962 | Pierce | Mar. 28, 1950 |
| 2,531,975 | Essex et al. | Nov. 28, 1950 |

OTHER REFERENCES

King: Pumice and Perlite as Industrial Materials in California, Calif. Journal of Mines and Geology, vol. 44, No. 3 (July 1948), pages 293–319.